United States Patent
Takikawa et al.

[11] Patent Number: 5,101,949
[45] Date of Patent: Apr. 7, 1992

[54] TEMPERATURE SENSITIVE FLUID-TYPE FAN COUPLING DEVICE

[75] Inventors: Kazunori Takikawa; Yuichi Ono, both of Numazu; Hiroshi Inoue, Fuji, all of Japan

[73] Assignee: Usui Kokusai Sangyo Kaisha, Ltd., Japan

[21] Appl. No.: 674,772

[22] Filed: Mar. 25, 1991

[30] Foreign Application Priority Data

Mar. 28, 1990 [JP] Japan .................... 2-32543[U]

[51] Int. Cl.⁵ .................. F16D 35/00; F16D 43/25
[52] U.S. Cl. .................. 192/58 B; 192/82 T; 192/84 PM
[58] Field of Search .............. 192/58 B, 82 T, 84 PM; 123/41.12

[56] References Cited

U.S. PATENT DOCUMENTS

| | | | |
|---|---|---|---|
| 2,879,755 | 3/1959 | Weir | 123/41.12 |
| 2,988,188 | 6/1961 | Tauschek | 192/82 T |
| 3,059,745 | 10/1962 | Tauschek | 192/58 B |
| 3,217,849 | 11/1965 | Weir | 192/82 T |
| 3,250,355 | 5/1966 | Weir | 192/58 B |
| 3,259,221 | 7/1966 | Godfrey | 192/58 B |
| 3,272,188 | 9/1966 | Sabat | 123/41.11 |
| 3,430,743 | 3/1969 | Fujita et al. | 192/58 B |
| 3,463,282 | 8/1969 | Fujita et al. | 192/58 B |
| 3,727,735 | 4/1973 | LaFlame | 192/58 B |
| 3,840,101 | 10/1974 | Peter et al. | 192/58 B |
| 3,856,122 | 12/1974 | Leichliter | 192/58 B |
| 3,964,582 | 6/1976 | Mitchell | 192/58 B |
| 4,238,016 | 12/1980 | Yoshida et al. | 192/58 B |
| 4,270,641 | 6/1981 | Nonnenmann et al. | 192/58 B X |
| 4,271,945 | 6/1981 | Budinski | 192/58 B |
| 4,281,750 | 8/1981 | Clancey | 192/58 B |
| 4,458,798 | 7/1984 | Bopp | 192/58 B |
| 4,505,367 | 3/1985 | Martin | 192/58 B |
| 4,556,138 | 12/1985 | Martin et al. | 192/82 T X |
| 4,629,046 | 12/1986 | Martin | 192/58 B |
| 4,665,694 | 5/1987 | Brunken | 60/330 |
| 4,667,791 | 5/1987 | Martin et al. | 192/58 B |
| 4,685,549 | 8/1987 | Brunken et al. | 192/58 B |
| 4,699,258 | 10/1987 | Johnston et al. | 192/58 B |
| 4,796,571 | 1/1989 | Ono et al. | 123/41.12 |
| 4,846,331 | 7/1989 | Ono | 192/58 B |
| 4,850,465 | 7/1989 | Ono | 192/58 B |
| 4,893,703 | 1/1990 | Kennedy et al. | 192/58 B |
| 4,903,643 | 2/1990 | Takikawa et al. | 123/41.12 |
| 4,903,805 | 2/1990 | Ono | 192/58 B |
| 4,930,458 | 6/1990 | Takikawa et al. | 123/41.12 |

FOREIGN PATENT DOCUMENTS

| | | | |
|---|---|---|---|
| 55-76226 | 6/1980 | Japan . | |
| 57-167533 | 10/1982 | Japan . | |
| 57-179431 | 11/1982 | Japan . | |
| 0091032 | 5/1985 | Japan | 192/82 T |
| 62-124330 | 6/1987 | Japan . | |

Primary Examiner—Rodney H. Bonck
Attorney, Agent, or Firm—Anthony J. Casella; Gerald E. Hespos

[57] ABSTRACT

A temperature sensitive fluid-type fan coupling device comprises a closed enclosure including a casing journalled on a rotary shaft through a bearing and having a cooling fan at its outer periphery, and a cover, a partition adapted to divide the interior of the closed enclosure into an oil chamber and a torque transmission chamber within which a drive disk is located and including a oil flow adjustment opening, a dam mounted to the inner periphery of the closed enclosure in a face-to-face relation to the outer periphery of the drive disk, an oil flowing toward the inner periphery of the closed enclosure during spinning of the closed enclosure, a circulation passage extending from the torque transmission chamber to the oil chamber through the dam, a valve element mounted within the oil chamber and having one end operable to open the flow adjustment opening when external temperature exceeds a given temperature and close the flow adjustment opening when external temperature is below the given temperature, a temperature sensitive element mounted to the front of the cover and deformed according to temperature fluctuation to move the valve element, and a magnet mounted to bias the valve element in a direction to open the flow adjustment opening.

8 Claims, 2 Drawing Sheets

TEMPERATURE SENSITIVE FLUID-TYPE FAN COUPLING DEVICE

BACKGROUND OF THE INVENTION

1. Field of the Invention

The present invention relates to an improvement in the structure of a temperature sensitive fluid-type fan coupling device wherein external temperature is constantly sensed while a vehicle is travelling so as to provide a controlled amount of cooling air to an antomobile engine by a cooling fan.

2. Description of the Prior Art

FIGS. 7 and 8 show the principal part of a conventional fan coupling device of this type. As illustrated, an oil chamber 26 is defined above a partition 25. The partition 25 has an opening 25' through which the oil chamber 26 is in communication with a torque transmission chamber 24. A temperature sensitive element is mounted to the front of a closed enclosure and is deformed in response to temperature fluctuation. A valve element 28 has a fixed end and is moved by the temperature sensitive element to open the opening 25' when external temperature exceeds a given temperature.

With such a conventional device, a connecting element (not shown) is connected to the valve element 28 so that the valve element 28 is movable when the temperature sensitive element is deformed. Also, the valve element is so wide as to open and close the opening 25'. Due to mutual engagement in a plane extending at right angles to the direction in which the flat and wide valve element 28 is displaced relative to the opening 25', a centrifugal force is applied to pressurize oil which flows from the oil chamber 26 to the torque transmission chamber 24 during opening and closing of the valve element 28. The resultant back pressure causes suction of the valve element 28 to close the opening 25'. This results in a decrease in the amount of oil in the torque transmission chamber 34. Torque is then less transmitted to reduce the speed of rotation of a cooling fan. As a result, the centrifugal force and consequent back pressure are decreased to cause opening 25' to be again opened. While the opening 25' is repeatedly opened and closed due to continuous suction, the valve element 28 is minutely vibrated to change the speed of rotation of the cooling fan with a short cycle. This is called "hunting" and deteriorates the function of the fan coupling device.

SUMMARY OF THE INVENTION

With the foregoing in mind, it is an object of the present invention to provide an improved temperature sensitive fluid-type fan coupling device which prevents minute vibration of the valve element as mentioned before and accurately and safely circulates a controlled amount of oil to eliminate "hunting".

In order to achieve the objects, there is provided a temperature sensitive fluid-type fan coupling device which comprises a closed enclosure including a casing journalled on a rotary shaft through a bearing and having a cooling fan at its outer periphery, and a cover, the rotary shaft having a front end to which a drive disk is secured, a partition adapted to divide the interior of the closed enclosure into an oil chamber and a torque transmission chamber within which the drive disk is located and including a oil flow adjustment opening, a dam mounted to the inner periphery of the closed enclosure in a face-to-face relation to the outer periphery of the drive disk, an oil flowing toward the inner periphery of the closed enclosure during spinning of the closed enclosure, a circulation passage extending from the torque transmission chamber to the oil chamber through the dam, a valve element mounted within the oil chamber and having one end operable to open the flow adjustment opening when external temperature exceeds a given temperature and close the flow adjustment opening when external temperature is below the given temperature, a temperature sensitive element mounted to the front of the cover and deformed according to temperature fluctuation to move the valve element, and a torque transmission space formed between confronting walls of the drive disk and the closed enclosure, an effective contact area of oil being increased and decreased to control transmission of a torque from the rotary shaft as a drive side to the closed enclosure as a driven side wherein magnet means is mounted to bias the valve element in a direction to open the flow adjustment opening. The magnet means and the partition repel each other at a position adjacent to the flow adjustment opening so as to open the flow adjustment opening. Alternatively, the magnet means and the partition or the valve element are attracted to one another at a position adjacent to the flow adjustment opening so as to open the flow adjustment opening. Also, the magnet means is mounted at least adjacent to the flow adjustment opening or on one side of the valve element in a face-to-face relation to the flow adjustment opening and made of rubber-bonded magnet or resin-bonded magnet.

In the present invention thus constructed, the magnet means is mounted on the valve element in a face-to-face relation to the flow adjustment opening so as to bias the valve element in a direction to open the flow adjustment opening and repels or attracts to overcome back pressure produced due to a centrifugal force applied to the valve element while the valve element is operable to open and close the flow adjustment opening. This prevents minute vibration of the valve element and enables accurate and safe control of oil flow. Thus, the present invention prevents changes in the speed of rotation of a fan with a relatively short cycle, so-called "hunting" and provides an improved performance.

BRIEF DESCRIPTION OF THE DRAWINGS

For a better understanding of the invention, reference may be had to the following description of preferred embodiments when taken in conjunction with the accompanying drawings, in which.

DESCRIPTION OF THE PREFERRED EMBODIMENTS

Figure 1:
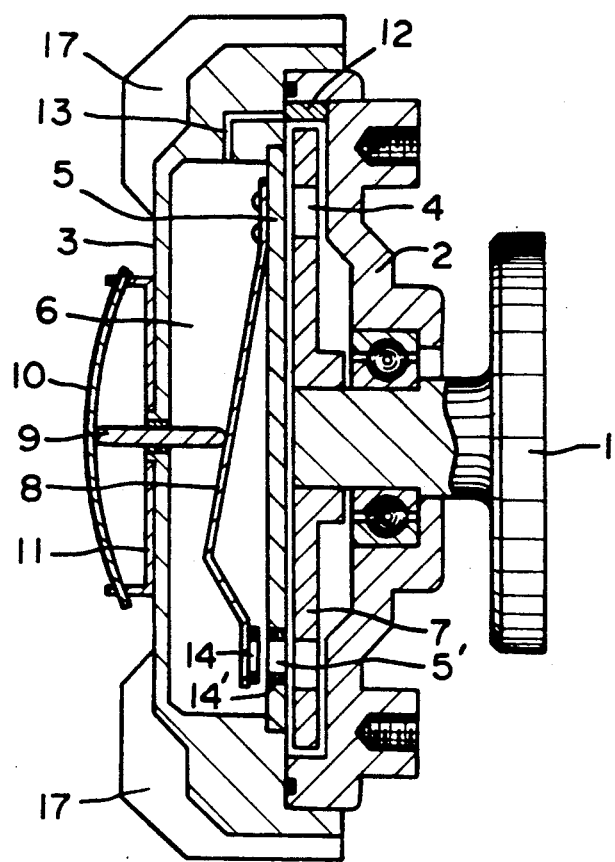
FIG. 1 is a vertical sectional view, partly broken away, of a temperature sensitive fluid-type fan coupling device according to one embodiment of the present invention.
Figure 2A:
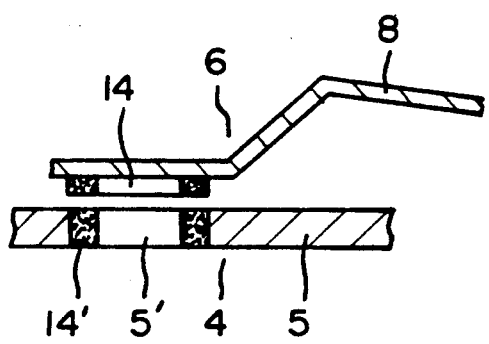
FIGS. 2A and 2B are partial sectional and top plan views, on an enlarged scale, showing the principal part of the device of FIG. 1 adjacent to a flow adjustment opening.
Figure 2B:
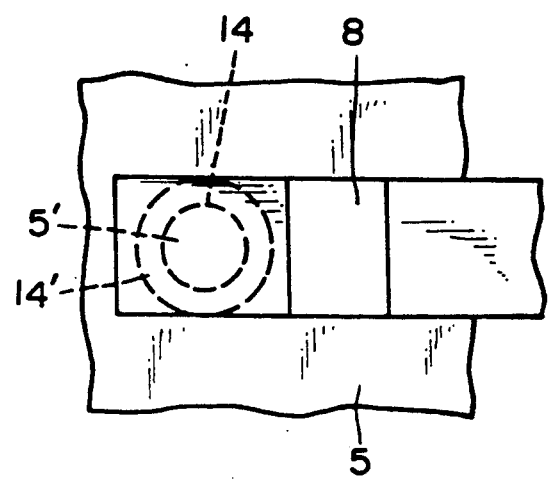
Figure 3:
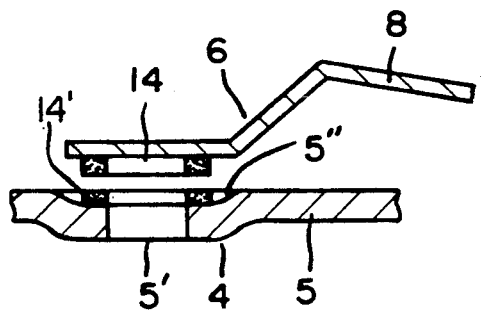
FIG. 3 is a view similar to FIG. 2A, but showing another embodiment of the present invention.
Figure 4:
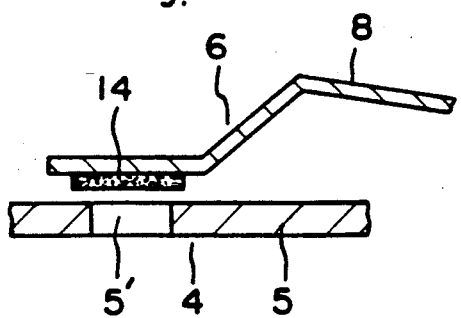
FIGS. 4 to 6 are views similar to FIG. 2A, but showing different embodiments of the present invention.
Figure 5:
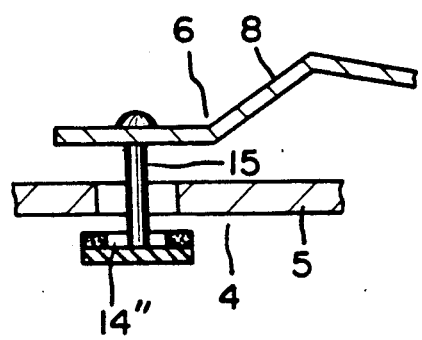
Figure 6:
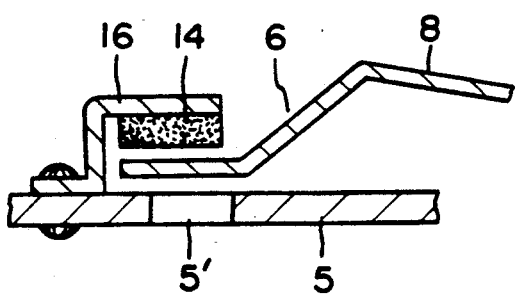
Figure 7:
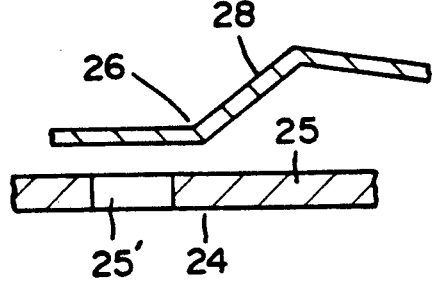
FIG. 7 is an enlarged sectional view of a part of a conventional device adjacent to a flow adjustment opening.
Figure 8:
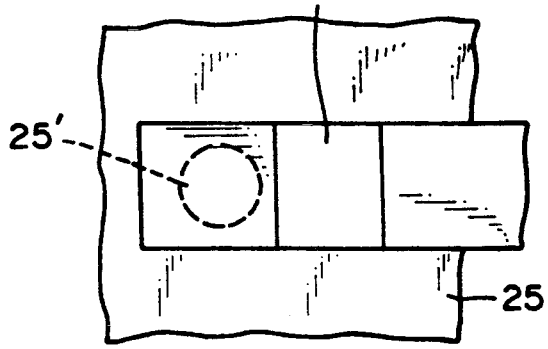
FIG. 8 is a top plan view of the device shown in FIG. 7.

With reference to FIGS. 1 through 6, the reference numeral 1 designates a drive or rotary shaft. A drive disk 7 is attached to the front end of the rotary shaft 1. A closed enclosure includes a casing 2 and a cover 3 and is rotatably mounted on the rotary shaft 7 through a bearing assembly. A cooling fan unit (not shown) is mounted at the outer periphery of the casing. The reference numeral 5 designates a disk or partition adapted to divide the interior of the enclosure into an oil chamber 6 and a torque transmission chamber 4 within which the drive disk 7 is located. The partition 5 has a flow adjustment opening 5' through which oil flows from the oil chamber 6 to the torque transmission chamber 4. A slight clearance is defined between the drive disk 7 and the adjacent wall of the casing so as to transmit torque. The reference numeral 8 designates a valve element operable to open and close the flow adjustment opening 5'. The valve element 8 is mounted within the oil chamber 6 and has one end riveted to the partition 5 and the other end located adjacent to the flow adjustment opening 5'. A plate-like bimetal or temperature sensitive element 10 has opposite ends held by a support 11 which is, in turn, fixedly attached to the front of the cover 3. The temperature sensitive element 10 is deformable according to external temperature fluctuation. Such deformation of the temperature sensitive element 10 is then transmitted through a connecting element 9 to the valve element 8. The reference numeral 12 designates a dam mounted to the inner periphery of the enclosure in a face-to-face relation to the outer periphery of the drive disk 7. Oil flows toward the inner periphery of the enclosure due to a centrifugal force produced during spinning of the enclosure. An inlet port is formed adjacent to the dam in a circumferential direction and connected to a circulation passage 13. Oil is pumped from the torque transmission chamber 4 through the inlet port and the circulation passage 13 to the oil chamber 4. The reference numeral 14 desingates a magnet means adapted to bias the valve element in a direction to open the flow adjustment opening 5'. As shown in FIGS. 2A and 2B, a magnet 14' is mounted around the opening 5' and has the same polarity as the magnet means of the valve element 8. Alternatively, the partition 5 has a recess 5" adjacent to the flow adjustment opening 5' to receive the magnet 14' as shown in FIG. 3. The magnet 14' has a central opening whose diameter is substantially equal to that of the flow adjustment opening 5'. The magnet 14' is mounted to the partition 5 so as to be substantially flush therewith. Still alternatively, the partition may be made of a magnetic material and has the same polarity as the magnet means of the valve element 8 as shown in FIG. 4. Also, as shown in FIG. 5, the valve element 8 has a support pin 15 which extends through the opening 5'. The magnet 14 is attached to the free end of the support pin 15 and located within the torque transmission chamber 4. The partition 5 is made of a magnetic material. The partition 5 and the magnet 14" have opposite polarities so that the magnet 14" may be attracted to the partition 5. The partition 5 may alternatively be made from a steel plate. As shown in FIG. 6, the magnet may be held by the partition 5 through a separate element 16 and has a polarity so that the valve element 8 is attracted to the magnet. In the embodiments shown in FIGS. 2 to 4, the magnet means 14 is located adjacent to the opening 5' and attached to at least one side of the valve element in a face-to-face relation to the opening 5'. In these embodiments, the magnet means may be made of rubber-bonded magnet or resin-bonded magnet so as to improve the integrity of seal when the valve is closed. The reference numeral 17 designates a cooling fin attached outside of the cover 3.

The present invention is not limited to the illustrated embodiments and may be applied to a temperature sensitive fluid-type fan coupling device wherein the outer periphery of the drive disk 7 and the inner periphery of the closed enclosure are radially meshed with one another to provide a labyrinth mechansim.

In the temperature sensitive fluid-type fan coupling device thus far described, the magnet means 14 is operable to bias the valve element 8 in a direction to open the flow adjustment opening 5'. While the valve element 8 is operable to open and close the flow adjustment opening 5', the temperature sensitive element 10 is deformed to cause the connecting element 9 to press the valve element 8 so as to close the flow adjustment opening 5', and the valve element 8 per se repels to open the flow adjustment opening 5'. In this connection, the magnet means 14 repels or attracts to overcome back pressure which may be produced when a centrifugal force is applied to the valve element 8 to pressurize oil and dampens or prevents minute vibration of the valve element 8 which may occur when the valve element 8 is repeatedly sucked to close and moved way to open the flow adjustment opening 5. Thus, the present invention provides an improved temperature sensitive fluid-type fan coupling device which accurately and safely, controls oil flow and prevents changes in the speed of rotation of the fan, so-called "hunting".

Although preferred embodiments of the present invention have been described in detail, it will be understood that various changes and modifications may be made therein without departing from the spirit and scope of the invention.

What is claimed is:

1. In a temperature sensitive fluid-type fan coupling device comprising: a closed enclosure including a casing journalled on a rotary shaft through a bearing and a cover, the closed enclosure defining an interior between the casing and the cover, the interior having an inner periphery, said rotary shaft having a front end to which a drive disk is secured said drive disk including an outer periphery; a partition adapted to divide the interior of the closed enclosure into an oil chamber and a torque transmission chamber within which the drive disk is located and the partition including an oil flow adjustment opening; a dam mounted to the inner periphery of the closed enclosure in opposed face-to-face relation to the outer periphery of the drive disk, an oil flowing toward the inner periphery of the closed enclosure during spinning of the closed enclosure; a circulation passage extending from the torque transmission chamber to the oil chamber through the dam; a valve element mounted within the oil chamber and having one end operable to selectively open and close the oil flow adjustment opening; a temperature sensitive element mounted to the cover and being deformed according to temperature fluctuation to move the valve element for closing the oil flow adjustment opening when external temperature is below a given temperature and to permit movement of the valve element for opening the oil flow adjustment opening when the external temperature exceeds the given temperature; and a torque transmission space formed in confronting walls of the drive disk and the closed enclosure, an effective contact area of oil being increased and decreased to control transmission of a torque from the rotary shaft as a drive side to the closed enclosure as a driven side, said fan coupling device comprising magnet means for biasing the valve element in a direction to open the flow adjustment opening so as to efficiently open the flow adjustment opening whenever movement of the valve element is permitted by the temperature sensitive element.

2. The device of claim 1, wherein the magnet means and the partition repel each other at a position adjacent to the flow adjustment opening so as to open the flow adjustment opening.

3. The device of claim 1, wherein the magnet means and the partition are attracted to one another at a position adjacent to the flow adjustment opening to open the flow adjustment opening.

4. The device of claim 1, wherein the magnet means and the valve element are attracted to one another at a position adjacent to the flow adjustment opening to open the flow adjustment opening.

5. The device of claim 1, wherein the magnet means is mounted at least adjacent to the flow adjustment opening or on one side of the valve element in a face-to-face relation to the flow adjustment opening and made of rubber-bonded magnet or resin-bonded magnet.

6. In a temperature sensitive fluid-type fan coupling device comprising: a closed enclosure including a casing journalled on a rotary shaft through a bearing and a cover, the closed enclosure defining an interior between the casing and the cover, the interior having an inner periphery; said rotary shaft having a front end to which a drive disk is secured, said drive disk including an outer periphery; a partition adapted to divide the interior of the closed enclosure into an oil chamber and a torque transmission chamber within which the drive disk is located, the drive disk including an oil flow adjustment opening; a dam mounted to the inner periphery of the closed enclosure is opposed face-to-face relation to the outer periphery of the drive disk, an oil flowing outwardly toward the inner periphery of the closed enclosure during spinning of the closed enclosure; a circulation passage extending from the torque transmission chamber to the oil chamber through the dam; a valve element mounted within the oil chamber and having one end operable to open the flow adjustment opening when external temperature exceeds a given temperature and close the flow adjustment opening when external temperature is below the given temperature; a temperature sensitive element mounted to the cover and deformed according to temperature fluctuation to move the valve element; and a torque transmission space formed in confronting walls of the drive disk and the closed enclosure, an effective contact area of oil being increased and decreased to control transmission of a torque from the rotary shaft as a drive side to the closed enclosure as a driven side, said fan coupling device comprising magnet means mounted to bias the valve element in a direction to open the flow adjustment opening, the magnet means and the partition being repelled from each other at a position adjacent to the flow adjustment opening so as to open the flow adjustment opening.

7. In a temperature sensitive fluid-type fan coupling device comprising: a closed enclosure including a casing journalled on a rotary shaft through a bearing and a cover, the closed enclosure defining an interior between the casing and the cover, the interior having an inner periphery; said rotary shaft having a front end to which a drive disk is secured, said drive disk including an outer periphery; a partition adapted to divide the interior of the closed enclosure into an oil chamber and a torque transmission chamber within which the drive disk is located, the drive disk including an oil flow adjustment opening; a dam mounted to the inner periphery of the closed enclosure in opposed face-to-face relation to the outer periphery of the drive disk, an oil flowing outwardly toward the inner periphery of the closed enclosure during spinning of the closed enclosure; a circulation passage extending from the torque transmission chamber to the oil chamber through the dam; a valve element mounted within the oil chamber and having one end operable to open the flow adjustment opening when external temperature exceeds a given temperature and close the flow adjustment opening when external temperature is below the given temperature; a temperature sensitive element mounted to the cover and deformed according to temperature fluctuation to move the valve element; and a torque transmission space formed in confronting walls of the drive disk and the closed enclosure, and effective contact area of oil being increased and decreased to control transmission of a torque from the rotary shaft as a drive side to be closed enclosure as a driven side, said fan coupling device comprising magnet means mounted to bias the valve element in a direction to open the flow adjustment opening, wherein the magnet means and the partition being attracted to one another at a position adjacent to the flow adjustment opening to open the flow adjustment opening.

8. In a temperature sensitive fluid-type fan coupling device comprising: a closed enclosure including a casing journalled on a rotary shaft through a bearing and a cover, the closed enclosure defining an interior between the casing and the cover, the interior having an inner periphery; said rotary shaft having a front end to which a drive disk is secured, said drive disk including an outer periphery; a partition adapted to divide the interior of the closed enclosure into an oil chamber and a torque transmission chamber within which the drive disk is located, the drive disk including an oil flow adjustment opening; a dam mounted to the inner periphery of the closed enclosure in opposed face-to-face relation to the outer periphery of the drive disk, an oil flowing outwardly toward the inner periphery of the closed enclosure during spinning of the closed enclosure; a circulation passage extending from the torque transmission chamber to the oil chamber through the dam; a valve element mounted within the oil chamber and having one end operable to open the flow adjustment opening when external temperature exceeds a given temperature and close the flow adjustment opening when external temperature is below the given temperature; a temperature sensitive element mounted to the cover and deformed according to temperature fluctuation to move the valve element; and a torque transmission space formed in confronting walls of the drive disk and the closed enclosure, an effective contact area of oil being increased and decreased to control transmission of a torque from the rotary shaft as a drive side to the closed enclosure as a driven side, said fan coupling device comprising magnet means mounted to bias the valve element in a direction to open the flow adjustment opening, wherein the magnet means is mounted at least adjacent to the flow adjustment opening in a face-to-face relation to the flow adjustment opening and is made of a resin-bonded magnet.

* * * * *